Dec. 10, 1968
G. VARGIU
3,416,087
PHASE-LOCKED SIGNAL SAMPLING CIRCUIT WITH ADAPTIVE SEARCH CIRCUIT
Filed Dec. 28, 1965
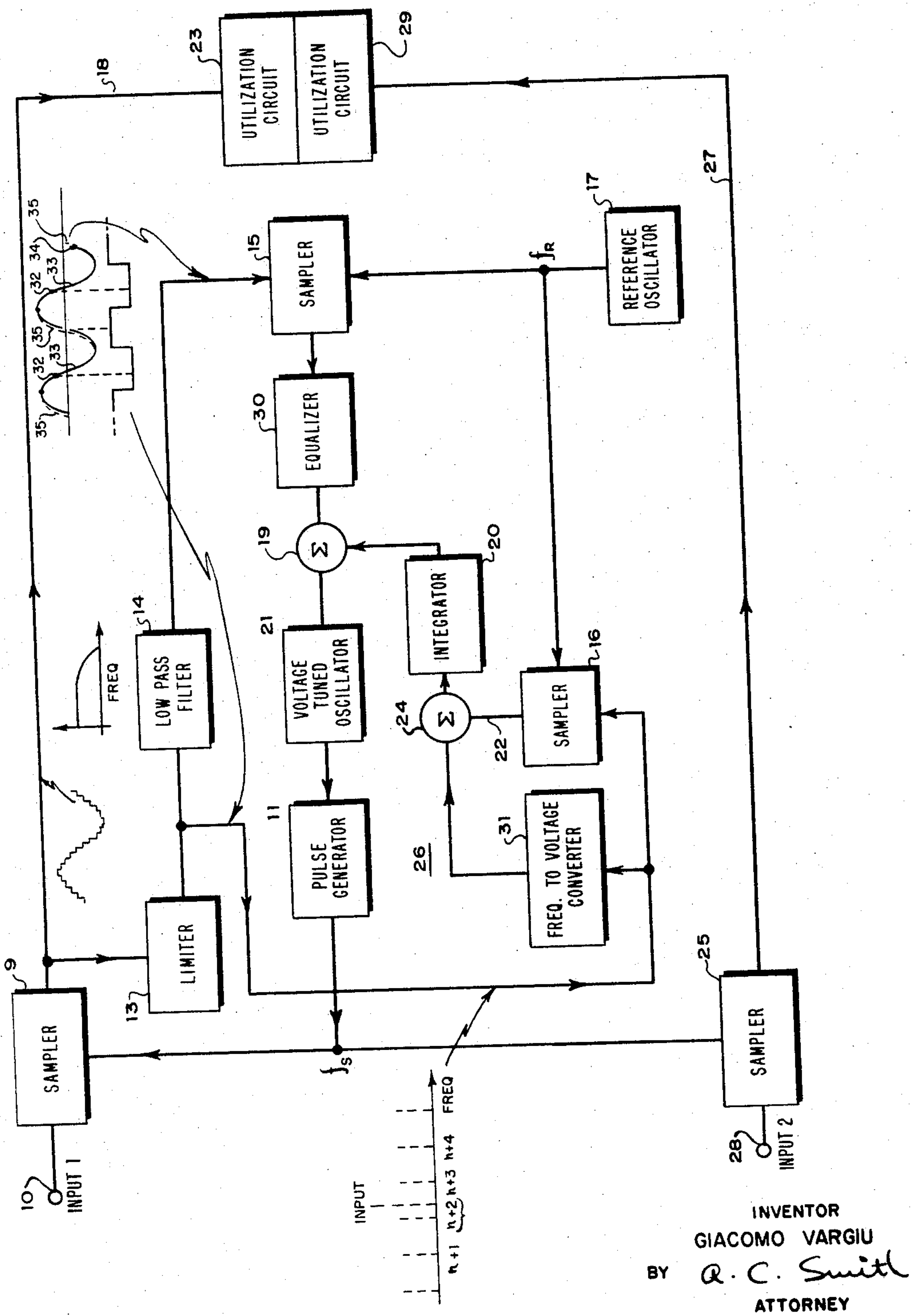
INVENTOR
GIACOMO VARGIU
BY R. C. Smith
ATTORNEY United States Patent Office 3,416,087

Patented Dec. 10, 1968

3,416,087

PHASE-LOCKED SIGNAL SAMPLING CIRCUIT WITH ADAPTIVE SEARCH CIRCUIT

Giacomo Vargiu, Redwood City, Calif., assignor to Hewlett-Packard Company, Palo Alto, Calif., a corporation of California Filed Dec. 28, 1965, Ser. No. 516,978
5 Claims. (Cl. 328—151)

This invention relates to harmonic phase lock circuits and has as an object the provision of a circuit which can search rapidly for a selected harmonic and can lock on a selected sideband of this harmonic separated therefrom by a fixed frequency.

This is accomplished according to the illustrated embodiment of the present invention by actuating an input signal sampler at a trigger rate that is controlled by a signal which is related in amplitude to the difference frequency between the input signal frequency and a harmonic of the sampler trigger rate.

Referring to the drawing, which shows a schematic diagram of the circuit of the present invention, there is shown a sampler 9 which is connected to receive trigger pulses from pulse generator 11 for producing sample pulses of the input signal appearing at input terminal 10. A phase lock loop for producing a fixed intermediate frequency signal on the output line 18 of sampler 9 is thus formed by the signal paths including sampler 9, limiter 13, filter 14, reference oscillator 17, sampler 15, equalizer 30, summing network 19 and voltage-tuned oscillator 21 which drives pulse generator 11.

During phase-locked operation, pulse generator 11 triggers sampler 9 at a repetition rate of about one megacycle to produce samples of the signal at input 10. The variations of sample pulse amplitude at the output of sampler 9 include a signal component at the frequency of reference oscillator 17 which is typically about 20 kilocycles per second. The amplitude of this signal component is clipped by limiter 13 to form a square wave at the reference frequency. The square wave is then filtered by low pass filter 14 for comparison in sampler 15 with the phase of the reference frequency to produce a control signal at one input of summing network 19. During phase-locked operation, no signal is applied to the other input of summing network 19 from the search loop circuitry 26 so that the control signal applied to the oscillator 21 is directly related to the phase relationship between the reference frequency and the mentioned signal component at the output of sampler 9. The control signal applied to oscillator 21 thus adjusts the repetition rate of pulses applied to the sampler 9 to maintain phase lock. Equalizer 30 includes suitable networks for altering the frequency response characteristics of the phase locked loop to ensure stable loop operation. Sampler phase-locked loops of this type are described in pending U.S. patent application Ser. No. 348,675, filed Nov. 2, 1964 by Chu-Sun Yen, and now issued as U.S. Patent No. 3,334,305. The intermediate frequency signal on the output line 18 applied to utilization circuit 23 thus includes amplitude and phase information about the signal at input 10. Sampler 25 also connected to receive the pulses from generator 11 produces sample pulses on line 27 for application to utilization circuit 29 such that the signals on lines 18 and 27 may be metered to provide indications of the amplitude signals at the inputs 10 and 28 as well as the relative phase relationship between these two signals.

Prior to establishment of phase locked operation, the output of sampler 9 includes a plurality of successive harmonics of the sampling frequency $f_s$ as well as beat frequencies formed as the combination of the input signal and these harmonics. Limiter 13 clips the amplitude of the signals on line 18 and passes only the beat frequencies for application to converter 31 and sampler 16. The frequency-to-voltage converter 31 thus applies to one input of summing network 24 a control voltage which is related to the beat frequency. Disregarding the other input 22 of network 24 for purposes of discussion, this control voltage is applied to integrator 20 for producing a ramp signal having a slope related to the amplitude of the control signal from network 24 and hence, to the value of the beat frequency. Oscillator 21 thus sweeps rapidly over a range of frequencies in a selected direction in response to the large slope of voltage change with time produced by integrator 20. The slope of voltage change with time decreases as the beat frequency decreases in response to a harmonic of the sampling frequency $f_s$ approaching the frequency of the input signal. The rate of frequency change thus slows down to enable the circuit to capture and lock onto the reference frequency. Sampler 16 which may have a narrow band operating range thus applies to the other input of network 24 a signal having either one of two possible values, as described later, in response to the square wave beat frequency approaching the reference frequency, i.e., approaching the frequency at which the square wave is sampled. This output combined in network 24 with the output from converter 31 thus approaches zero as the frequency of oscillator 21 is swept to within the capture range of the circuit. The phase-lock loop previously described thus maintains phase lock between the reference frequency from oscillator 17 and the mentioned signal component of the variations of sample pulses at the output of sampler 9.

Phase lock is always established on the same side, say on the higher frequency side, i.e. on the upper sideband, of the harmonic of the sampling frequency $f_s$, and at a frequency separation equal to the reference frequency $f_r$. Assume for analysis that phase lock is properly established between the reference frequency and the upper sideband signal component of the variations in amplitude of sample pulses at the output of sampler 9. Low pass filter 14 has two poles at frequency $f_r$ such that the signal applied to sampler 15 from this filter lags the fundamental component of the square wave at the output of limiter 13 by 90° or, this fundamental component leads by 90° the filtered signal which is locked to reference frequency $f_r$. Sampler 16 thus samples the square wave output of limiter 13 at the reference frequency rate $f_r$ and at an instant 32 which occurs along a selected portion, say portion 33, of each cycle to produce a negative signa at the output of sampler 16. This negative signal at the output of sampler 16 combines in network 24 with the positive output of equal amplitude from converter 3 operating on the square wave of frequency $f_r$ to yield zer output for altering the frequency oscillator 21. Phase locked operation of the circuit on the desired upper side band therefore remains under control of the output o sampler 15.

If the circuit phase locks to the undesired or lowe sideband of a harmonic of the sampling frequency f then the square wave output of limiter 13 and the outpu of filter 14 in the phase relationship shown are out ( phase with the reference frequency such that sample taken by sampler 16 at an instant 34 which occurs ove the portion 35 of the signal from reference oscillator 1 produce a positive signal at the output of sampler 16. Th signal combined with the output of converter 31 suppli an input signal to integrator 20, the output of which th causes oscillator 21 to continue sweeping through operating range of frequencies until phase lock is established on the desired upper sideband at a frequen separation equal to the reference frequency $f_r$.

I claim:

1. A signal circuit comprising:
a source of sampling signal;
a sampler connected to receive an applied signal and sampling signal from said source for producing a sample pulse having an amplitude related to the amplitude of the applied signal at the occurrence of a sampling signal;
a source of reference frequency;
means connected to receive the reference frequency and the sample pulses from said sampler for producing a first control signal related to the phase relationship between the reference frequency and a selected signal component of variations in the amplitude of said sample pulses;
circuit means responsive to a selected signal component of the variations in the amplitude of said sample pulses for producing a second control signal related to the frequency of the selected signal component; and
means for applying the combination of said first and second control signals to said source of sampling signals for altering the repetition frequency thereof.

2. A signal circuit as in claim 1 comprising:
another sampler connected to receive said reference signal and the sample pulses for producing an output related to the phase relationship between a selected signal component of the variations of sample pulse amplitude and said reference frequency; and
means combining the outputs of said circuit means and said other sampler for producing said second control signal.

3. A signal circuit as in claim 2 wherein the last-named means includes an integrator for producing said second control signal having an amplitude which varies with time at a rate related to the combination of the signals from said circuit means and from said other sampler.

4. A signal circuit as in claim 1 comprising:
means connected to receive the output of said one sampler for producing a selected phase shift of said selected signal component for application to one of said other sampler and said means for producing the first control signal.

5. A signal circuit as in claim 1 wherein:
the means for producing said first control signal receives the sample pulses from the first-named sampler through an amplitude limiter and a filter which shifts the phase of the signal at the output of the limiter by approximately 90° at the reference frequency;
another sampler which is connected to receive the reference frequency and said circuit means are both connected to receive the signal at the output of said limiter; and
means are connected to receive the outputs of said circuit means and said other sampler for producing said second control signal having an amplitude which varies with time at a rate related to the combination of said outputs from said circuit means and said other sampler.

References Cited

UNITED STATES PATENTS

| | | | |
|---|---|---|---|
| 3,092,778 | 6/1963 | Siomko | 328—165 |
| 3,181,122 | 4/1965 | Brown | 328—155 XR |
| 3,260,936 | 7/1966 | Hewlett et al. | 324—85 XR |
| 3,334,305 | 8/1967 | Chu-Sun Yen | 328—151 |

ARTHUR GAUSS, *Primary Examiner.*

STANLEY T. KRAWCZEWICZ, *Assistant Examiner.*

U.S. Cl. X.R.

328—155, 165; 324—85